(12) United States Patent
Dundas et al.

(10) Patent No.: US 12,011,889 B2
(45) Date of Patent: Jun. 18, 2024

(54) CAULS HAVING INTEGRATED EDGE SEALS AND SEALING METHOD

(71) Applicant: The Boeing Company, Chicago, IL (US)

(72) Inventors: Kiefer Douglas Dundas, Bellingham, WA (US); Samuel Brickey, Bellingham, WA (US); David Andrew Lemme, Sedro Woolley, WA (US); Collin Wayne Petersen, Bellingham, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/649,424

(22) Filed: Jan. 31, 2022

(65) Prior Publication Data

US 2022/0332064 A1 Oct. 20, 2022

Related U.S. Application Data

(60) Provisional application No. 63/201,135, filed on Apr. 14, 2021.

(51) Int. Cl.
*B29C 70/54* (2006.01)
*B29C 70/34* (2006.01)
*B29L 31/30* (2006.01)

(52) U.S. Cl.
CPC .......... *B29C 70/549* (2021.05); *B29C 70/342* (2013.01); *B29L 2031/3082* (2013.01)

(58) Field of Classification Search
CPC ..... B29C 70/44; B29C 70/342; B29C 70/446; B29C 70/549; B29C 43/56; B29C 2043/561; B29C 2043/562
See application file for complete search history.

(56) References Cited

U.S. PATENT DOCUMENTS

| | | |
|---|---|---|
| 6,431,850 B1 | 8/2002 | Evans et al. |
| 8,333,864 B2 | 12/2012 | Brennan et al. |
| 8,613,301 B2 | 12/2013 | Brennan et al. |
| 8,684,343 B2 | 4/2014 | Hiken et al. |
| 10,935,519 B2 | 3/2021 | Huang |
| 2008/0083493 A1* | 4/2008 | Ridges .................. B29C 70/544 156/382 |
| 2012/0025437 A1* | 2/2012 | Allred, III ................ B25B 5/16 269/286 |
| 2013/0113142 A1* | 5/2013 | Dull ...................... B29C 70/342 425/405.2 |
| 2019/0353040 A1* | 11/2019 | Robertson, Jr. ....... B29C 70/682 |
| 2020/0331634 A1 | 10/2020 | Knutson et al. |

FOREIGN PATENT DOCUMENTS

EP 2939819 A1 11/2015

OTHER PUBLICATIONS

European Patent Office Extended Search Report, dated Sep. 8, 2022, regarding Application No. EP22163390.2, 5 pages.
Smith et al., "Caul Plate System for Aircraft Fabrication," U.S. Appl. No. 17/454,265, filed Nov. 10, 2021, 49 pages.
Kendall et al., "Apparatus and Method for Processing a Composite Structure," U.S. Appl. No. 63/174,631, filed Apr. 14, 2021, 70 pages.

* cited by examiner

*Primary Examiner* — Yunju Kim
(74) *Attorney, Agent, or Firm* — Yee & Associates, P.C.

(57) ABSTRACT

A composite part layup is compacted and cured on a mandrel using one or more cauls that are sealed together and to the mandrel, creating a vacuum tight enclosure over the composite part layup.

20 Claims, 15 Drawing Sheets

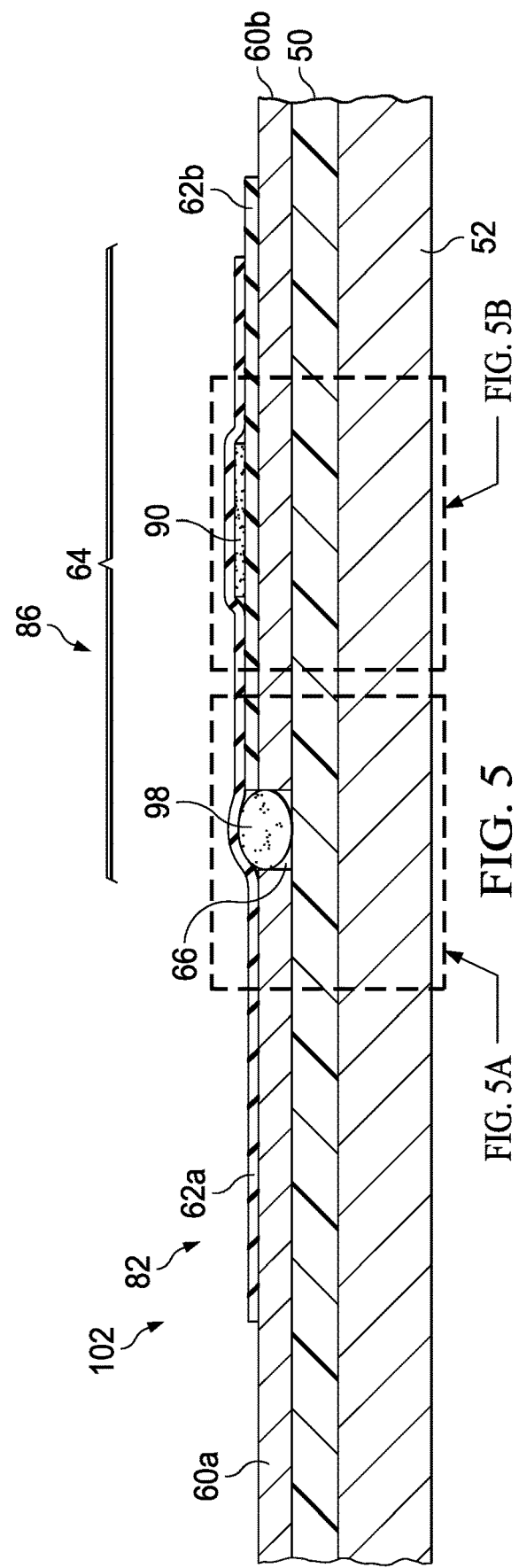

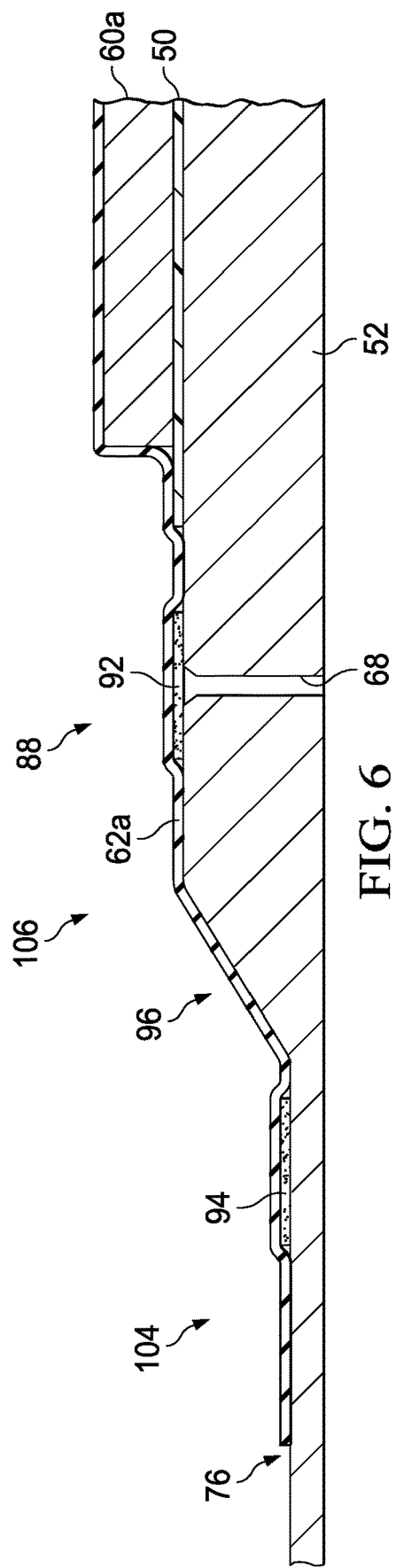

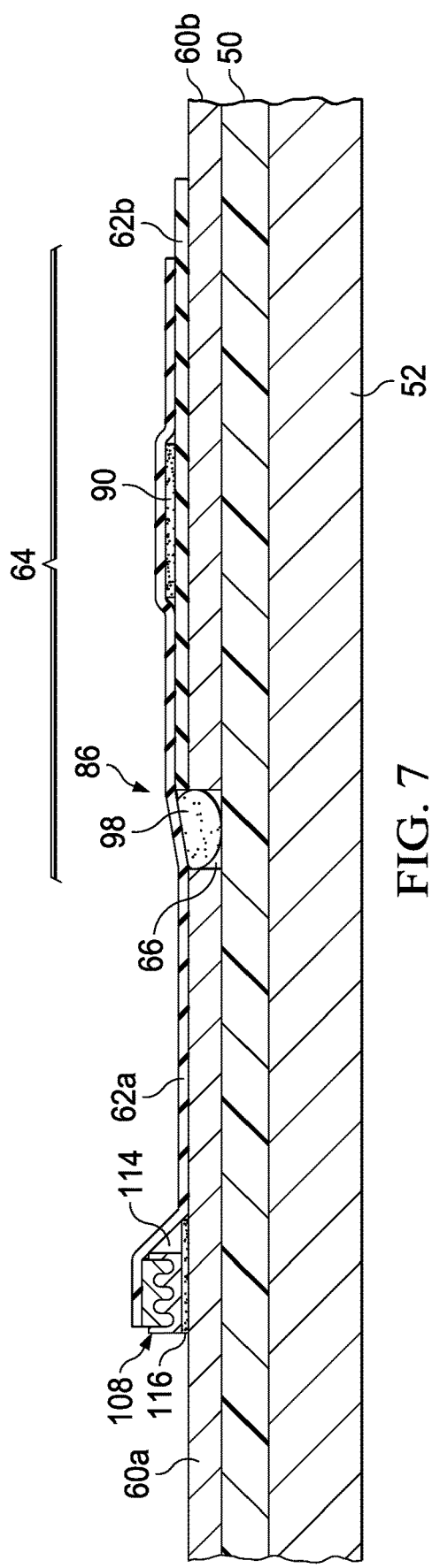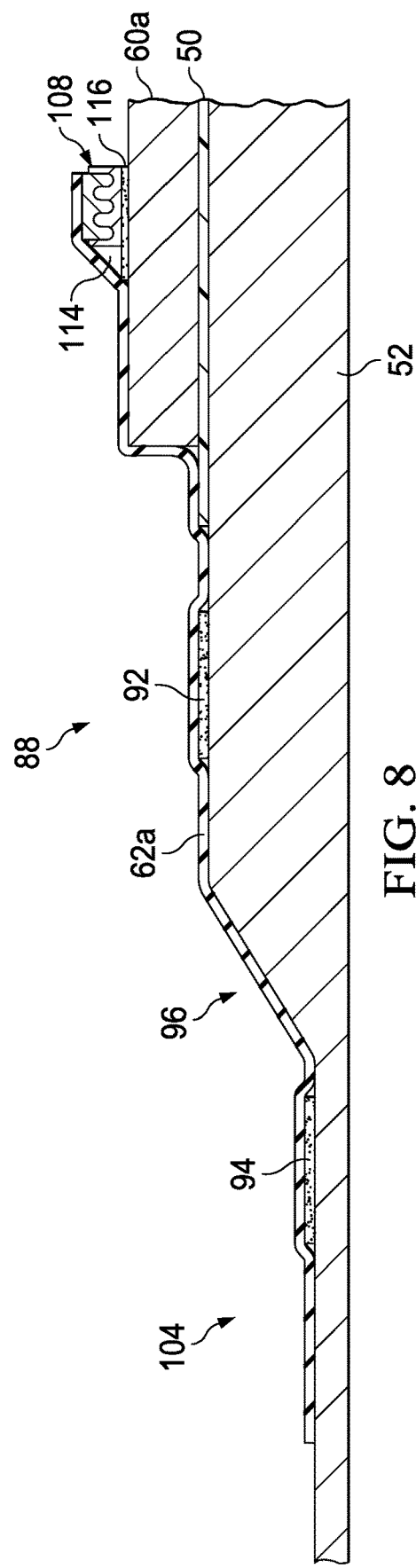

CAULS HAVING INTEGRATED EDGE SEALS AND SEALING METHOD

CROSS-REFERENCE TO RELATED APPLICATION

This application claims the benefit of U.S. Provisional Patent Application Ser. No. 63/201,135, filed Apr. 14, 2021, and entitled "Cauls Having Integrated Edge Seals and Sealing Method;" which is incorporated herein by reference in its entirety.

BACKGROUND INFORMATION

1. Field

The present disclosure generally relates to production of composite structures, and deals more particularly with a method and seals for sealing the edges of a caul over a part layup on a tool.

2. Background

Cauls are sometimes placed on a composite part layup in preparation for vacuum bag compaction and curing in order to achieve a desired part finish and/or to evenly apply compaction pressure over part. A flexible vacuum bag is placed over the caul and is sealed around its periphery to an underlying cure tool using a sealant tape. The process of draping the vacuum bag over a caul on a part layup and sealing the periphery of the bag to the tool can be a time-consuming process, particularly where the part is large-scale, such as the composite aircraft fuselage, or a fuselage section or a panel. Following curing of the part, either using autoclave or out-of-autoclave processes, the bag and sealant tape are removed and discarded. The bag material and sealing tape are thus consumable items that increase production costs, including cost for materials and manpower needed for vacuum bagging and sealing the bag to the mandrel.

It would therefore be desirable to be able to more easily and quickly cover a part layup and form a vacuum tight seal over a mandrel.

SUMMARY

The disclosure relates in general to processes and equipment for manufacturing composite structure, and more specifically to methods and equipment for sealing a caul over a composite part layup on a tool.

According to one aspect, an apparatus is provided for sealing a caul over a composite part layup on a tool. The apparatus includes an edge seal extending around a perimeter of the caul and configured to form a substantially vacuum tight seal between the caul and the tool.

According to another aspect, an apparatus is provided for sealing the least first and second cauls over a composite barrel part layout on a mandrel. The apparatus includes a first edge seal and a second edge seal. The first caul seal extends around the perimeter of the first caul and is configured to form a vacuum tight seal between the first caul and the mandrel. The second edge seal extends around the perimeter of the second caul, and is configured to form a vacuum tight seal between the second caul and the mandrel. The first and second caul seals overlap each other and are configured to form a vacuum tight seal between the first and second cauls.

According to still another aspect, a method is provided of making at least a section of a composite barrel. The method includes forming a composite barrel part layup on the mandrel, placing at least a first caul on the composite part layup, and forming a vacuum tight seal between the first caul and the mandrel, including sealing a perimeter of the first caul to the mandrel.

One of the advantages of the disclosed embodiments is that consumables such as large vacuum bags and sealant tape are reduced or eliminated, thus reducing production costs. Another advantage is that materials required to form a vacuum tight seal between a caul placed over a part layup and a tool are integrated into the caul, allowing the caul to be installed and sealed over the part layup more quickly. Another advantage is that the need for draping, positioning and sealing large vacuum bags over the cauls is eliminated, thus reducing processing time and allowing increased production rates.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 5 is an illustration of a sectional view taken along the line 5-5 in FIG. 4.

FIG. 6 is an illustration of a sectional view taken along the line 6-6 in FIG. 4.

FIG. 7 is an illustration of a sectional view similar to FIG. 5, but showing an alternate form of attachment of the edge seal to a caul.

FIG. 8 is an illustration of a sectional view similar to FIG. 6, but showing an alternate form of attachment of the edge seal to a caul.

DETAILED DESCRIPTION

Figure 1:
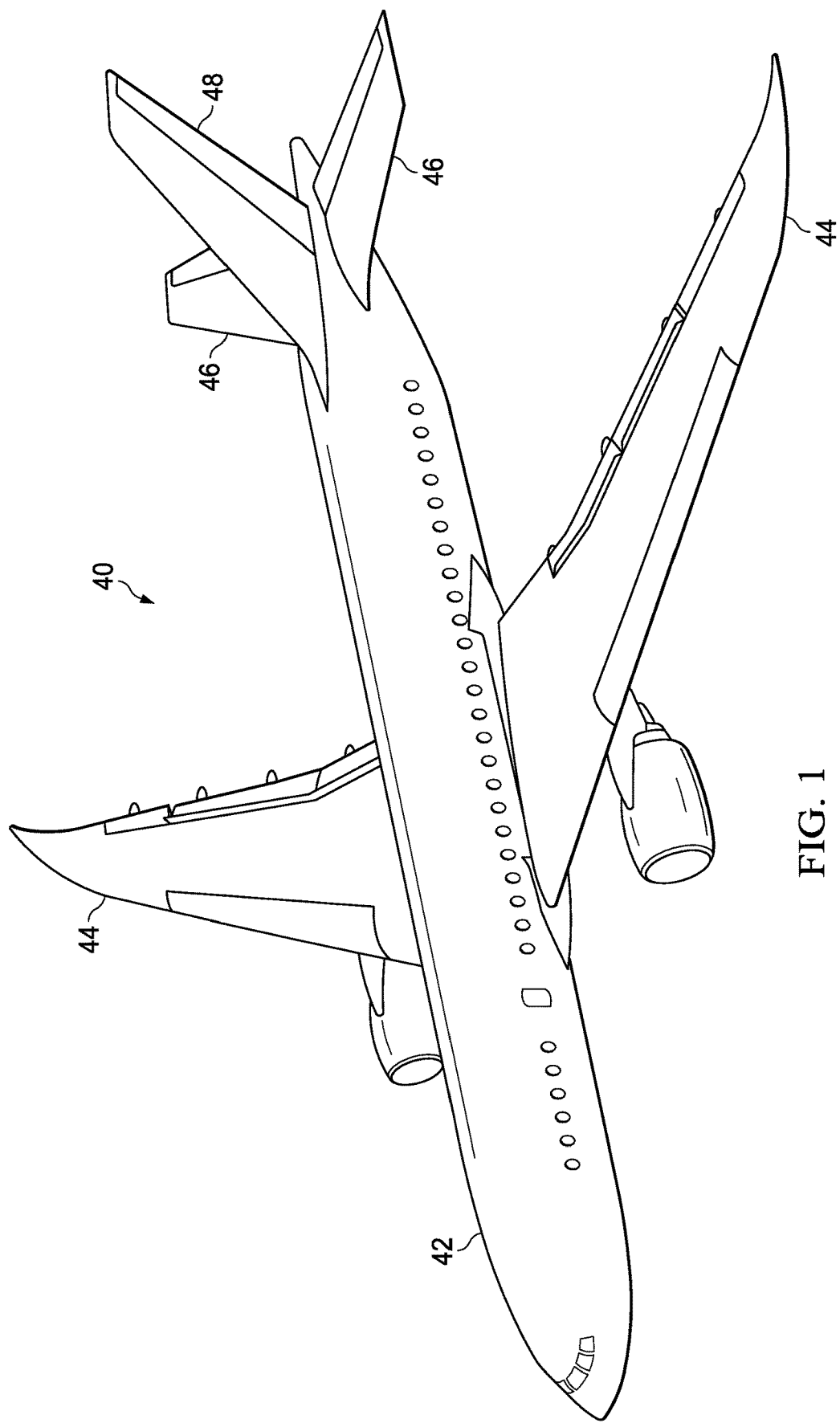
FIG. 1 is an illustration of a perspective view of an aircraft.
Figure 2:
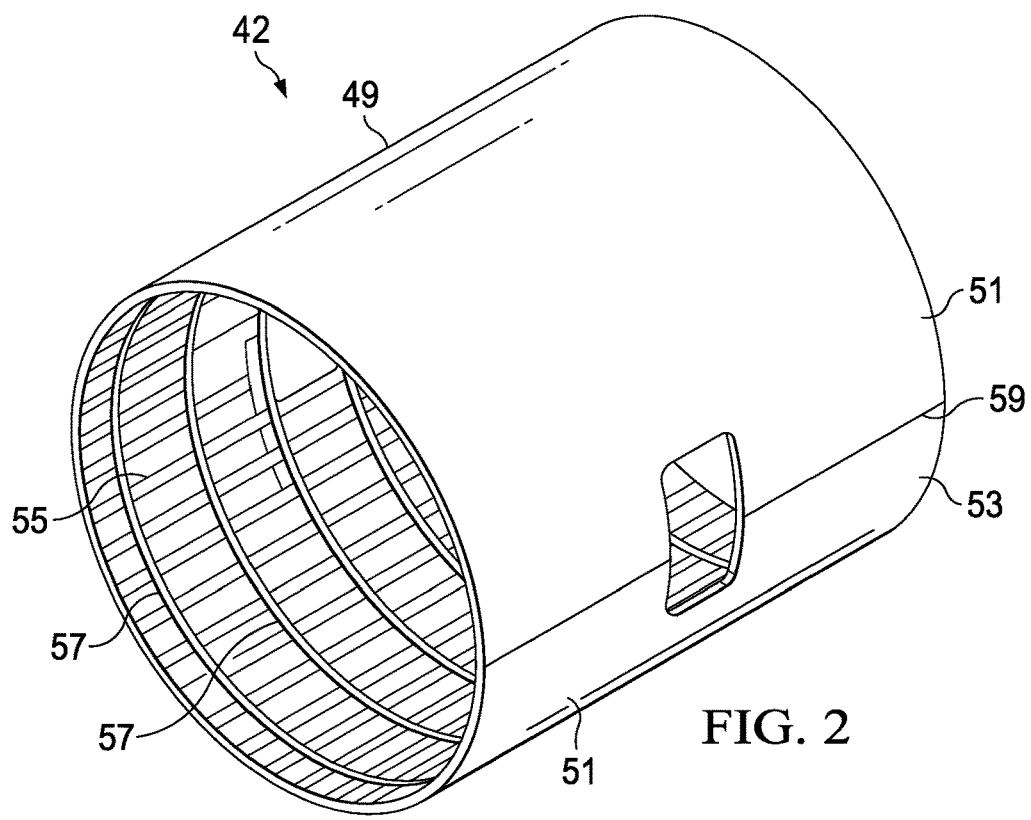
FIG. 2 is an illustration of a perspective view of a section of the fuselage of the aircraft shown in FIG. 1.

Referring first to FIG. 1, an aircraft 40 includes a fuselage 42, wings 44, horizontal stabilizers 46, and a vertical stabilizer 48. In the illustrated example, the fuselage 42 is substantially cylindrical, however, in other examples the cross-sectional shape of the fuselage 22 may have an oval or similar cross sectional shape. Referring also to FIG. 2, the fuselage 42 may comprise a plurality of barrel sections 49 joined together end-to-end. Each of the barrel sections 49 comprises barrel halves 51 joined together along a belt line 59, each of which comprises an outer skin 53 formed of a composite laminate and reinforced by circumferentially extending, longitudinally spaced frames 57, and longitudinally extending stringers 55. The outer skin 53, frames 57 and stringers 55 may each comprise a composite material, such as a carbon fiber reinforced plastic (CFRP) laminate. In other examples, the barrel sections 49 may be produced as a single cylindrical structure, rather than in two barrel halves 51.

Figure 3:
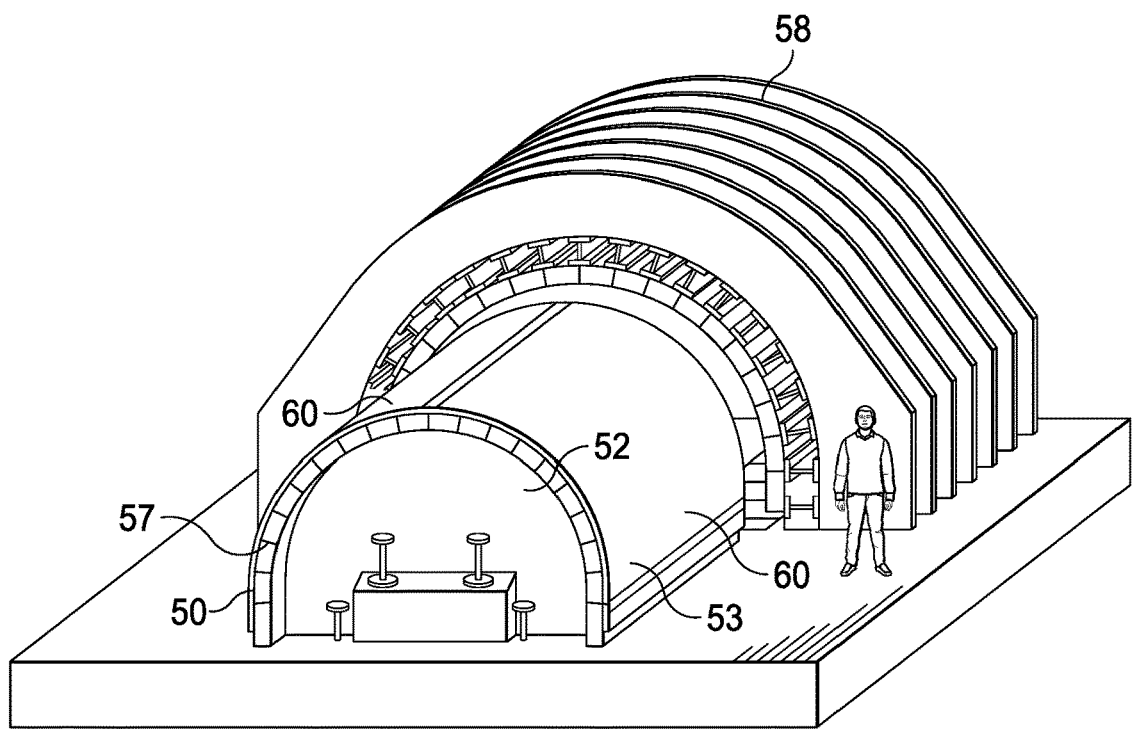
FIG. 3 is an illustration of a perspective view of a half barrel part layup on a mandrel, ready to be moved into an autoclave for curing.

Referring now to FIG. 3, in one production example, each of the barrel halves 51 is produced by laying up composite material on a mandrel 52 that may be formed of a metal and has a half barrel shape. Layup of the composite material may be performed by automatic fiber placement machines (not shown) or similar robotic manipulators that lay down layers of composite tape or split tape over the mandrel 52. Prior to laying up the composite material on the mandrel 52, stringers 55 are placed in longitudinal recesses (not shown) in the surface of the mandrel 52. With the stringers 55 having first been installed on the mandrel 52, the outer skin 53 is then laid up on the mandrel 52 in direct contact with the stringers 55. The outer skin 53 and the stringers 55 are then cocured. For convenience of description, the outer skin laid up on the mandrel 52 will sometimes be referred to herein as a part layup 50.

Figure 4:
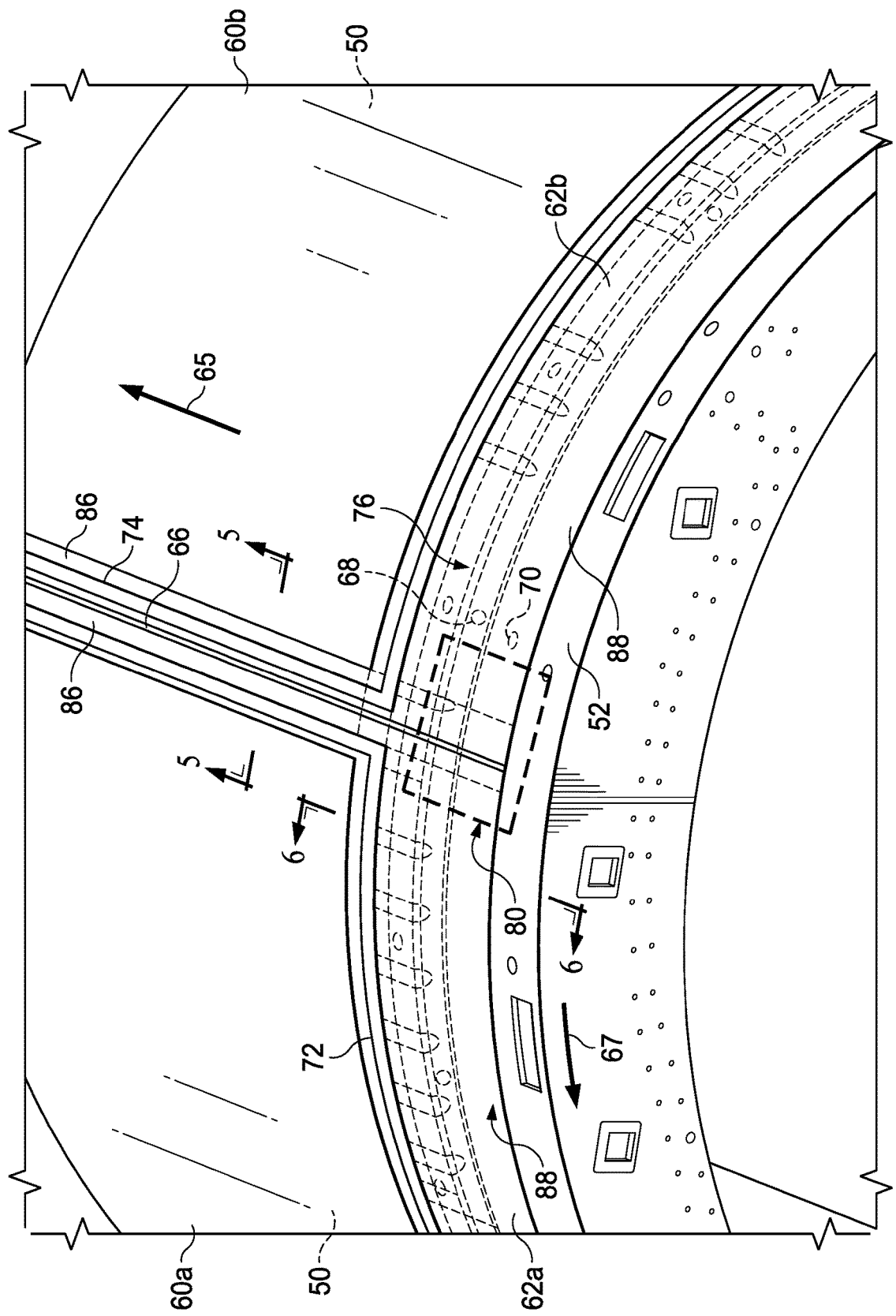
FIG. 4 is an illustration of a fragmentary, perspective view of a portion of the part layup shown in FIG. 3.

Referring to FIGS. 3 and 4, following material layup, one or more cauls 60a, 60b are placed on the part layup 50 in preparation for compacting and curing the part layup 50 in an autoclave 58. The cauls 60a, 60b function to provide a desired profile and/or surface roughness or finish on the OML (outer mold line) of the outer skin 53, while also applying even compaction pressure to the part layup 50 under autoclave pressure. In the illustrated example, two cauls 60a, 60b are placed over the part layup 50, however in other examples, a single, half barrel shaped caul (not shown) may be placed over the part layup 50. As will be discussed below in greater detail, the part layup and the cauls 60a, 60b are not vacuum bagged in the usual manner, but rather a vacuum tight seal is formed over the part layup 50 by sealing the cauls 60a, 60b to each other and to the mandrel 52 using edge seals 62a, 62b (discussed later in connection with FIG. 4) which are clamped together and to the mandrel 52. The edges seals 62a, 62b effectively form localized sealing zones between the cauls 60a, 60b, as well as between the cauls 60a, 60 and the mandrel 52. The combination of the cauls 60a, 60b and integrated edge seals 62a, 62b form a vacuum tight enclosure over the part layup 50, thereby eliminating the need for a separate, all-encompassing vacuum bag, and saving the time required to install a vacuum bag, while reducing consumables. In some examples, the mandrel 52 may comprise a full barrel shape, rather than a half barrel in which case cauls 60 are installed over the full barrel part layup and are sealed to each other and to the mandrel 52. In fact, in some applications, depending on the size and geometry of the part layup 50, n number of cauls 60 (e.g. 4, 6 or 8) may be installed and sealed over the part layup 50. Moreover, the n number of cauls 60 may be arranged side-by-side in the longitudinal direction 65 (FIG. 4) as well as in the circumferential direction 67 of the part layup 50. As used herein the term "caul" is used in its broadest sense and is defined as any type of vacuum integral tooling that provides profile control and/or surface finish or treatment of the OML of the part layup 50.

Attention is now directed to FIGS. 4, 5 and 6, which illustrate additional details showing how the cauls 60a, 60b are sealed to each other and to the mandrel 52 in order to form a vacuum tight enclosure over the part layup 50. The cauls 60a, 60b have IMLs (inner mold lines) complementing the OML (outer mold line) of the barrel sections 49 and are separated by a gap 66, which allows them to expand relative to each other when heated to processing temperatures. The cauls 60a, 60b, sometimes, referred to herein as first and second cauls respectively, have edge seals 62a, 62b that overlie and are attached to their entire outer perimeters. Thus, the edge seals 62a, 62b are respectively integrated into the cauls 60a, 60b and remain attached to the cauls 60a, 60b upon removal of the cauls 60a, 60b from the part layup 50. Each of the edge seals 62a, 62b includes a longitudinal section 86 extending in a longitudinal direction 65 along the gap 66 between the two cauls 60a and 60b, and a circumferential section 88 extending in a circumferential direction 67 along the circumference of the mandrel 52. The longitudinal sections and the circumferential sections 88 of the edge seals 62a, 62b intersect each other to form a T-junction 80. The edge seals 62a, 62b extend over the top of vacuum ports 68 and pressure sensor ports 70 in the mandrel 52 which are respectively used to draw and sense a vacuum beneath the cauls 60a, 60b to aid in compaction of the part layup 50.

Each of the edge seals and 62a, 62b is a strip of material comprising a relatively thin, flexible membrane-like elastomer, such as silicone rubber or Viton© that is sufficiently durable to permit repeated use. The ability to reuse the edge seals 62a, 62b and the fact that they are permanently attached to the cauls 60a, 60b, reduces installation labor costs as well as expendables. The elastomer selected is capable of withstanding the temperatures and pressures normally used to compact and cure fiber reinforced polymer materials, such as CFRP. The longitudinal section 86 of edge seals 62a includes a flap that overlaps the longitudinal section 86 of the adjacent edge seal 62b, and spans the gap 66 between the cauls 60a, 60b.

Figure 5A:
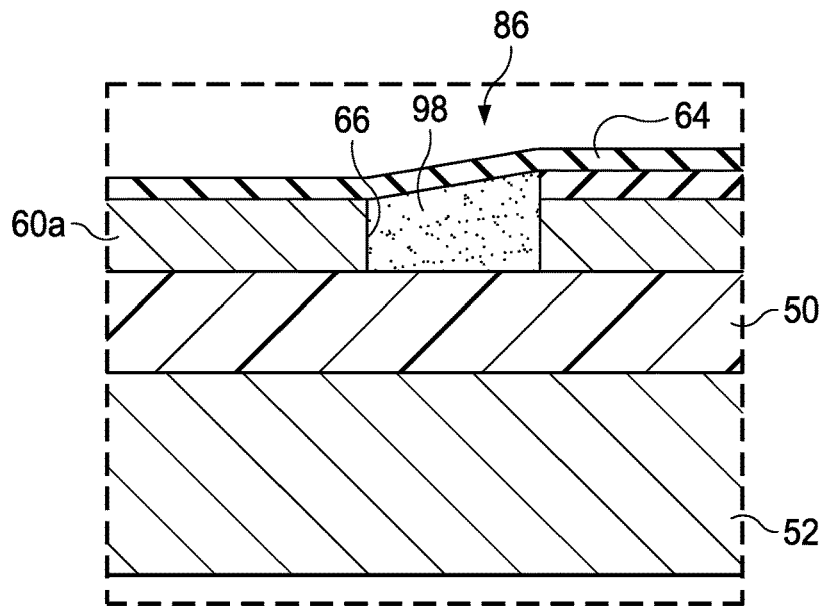
FIG. 5A is an illustration of the area designated as "FIG. 5A" in FIG. 5.

A filler 98 (FIG. 5) formed from a suitable material such as an elastomer is placed in the gap 66 to prevent undesired sagging of the flap 64 within the gap 66 during autoclave processing, and to apply compaction pressure to the part layup 50 across the gap 66. Use of the filler 98 results in even compaction pressure being applied to the part layup 50 between the cauls 60a, 60b, despite the presence of the gap 66. FIG. 5A shows the filler 98 having been compressed by the flap 64 due to vacuum and/or autoclave pressure, causing the filler 98 to deform, fill the gap 66, and apply compaction pressure to the part layup between the cauls 60a, 60b. A breather 90 is placed between the flap 64 and the underlying edge seal 62b to allow escape of air and volatiles from the part layup 50, and to assist in spreading the vacuum applied to the part layup 50 throughout the area beneath the cauls 60a, 60b.

Figure 5B:
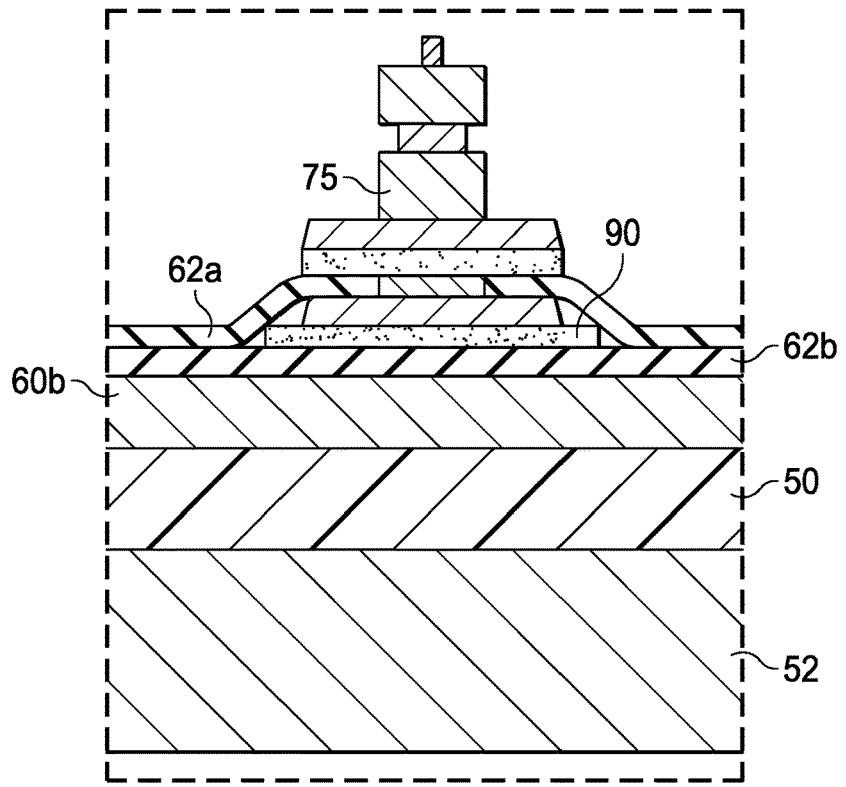
FIG. 5B is an illustration of the area designated as "FIG. 5B" in FIG. 5.
Figure 5C:
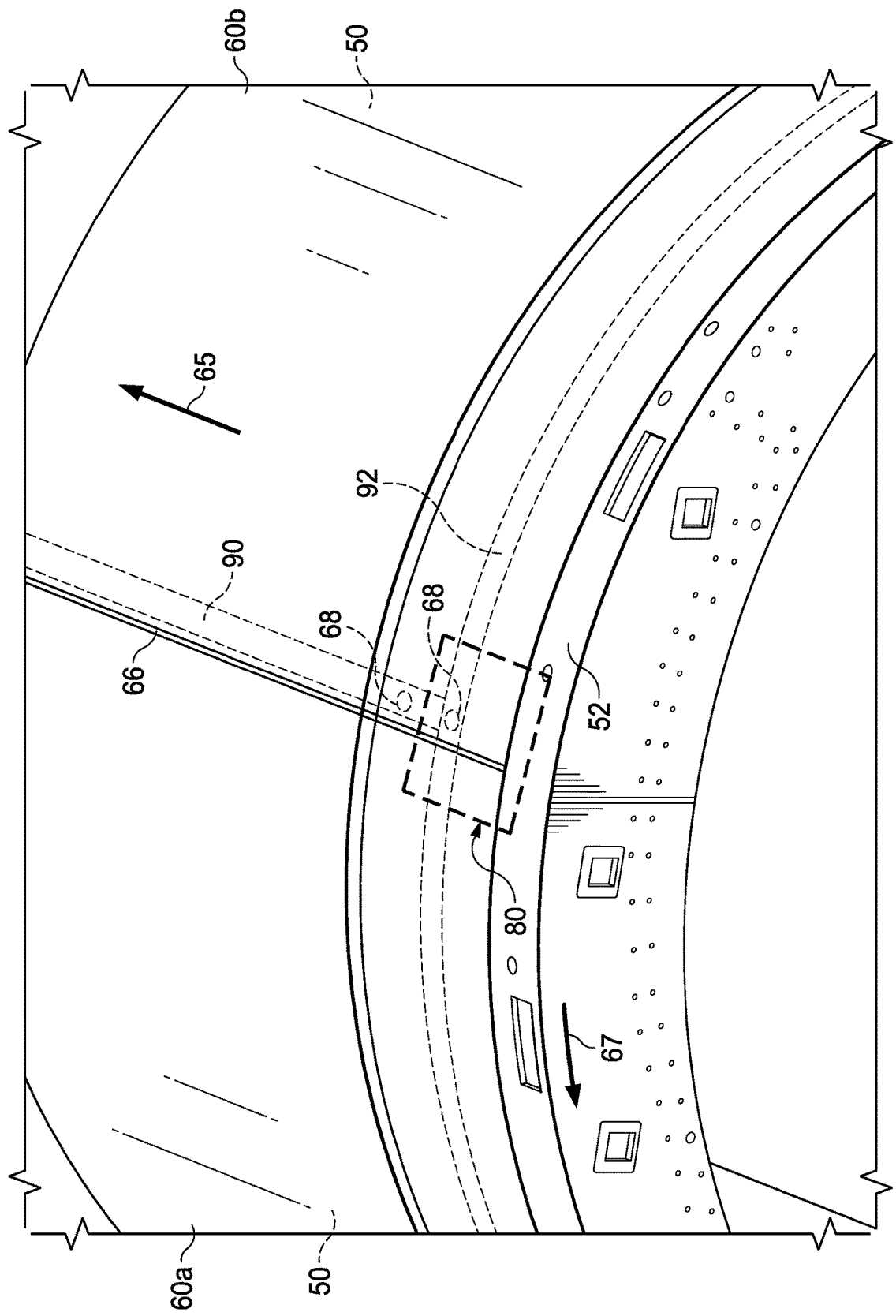
FIG. 5C is an illustration similar to FIG. 4, but simplified and showing the location of the breathers in broken lines.

In one example, shown in FIG. 5B, a vacuum source (not shown) may be coupled to the longitudinally extending edge seals 62a over the breathers 90 using a vacuum fitting 75 that is external. The vacuum source that is coupled with the vacuum fitting 75 may be any suitable vacuum generating device, including those normally used to evacuate typical vacuum bags. The vacuum fitting 75 allows a vacuum to be applied through the breather 90 to those areas beneath the edge seal 62a, or in other words, to those areas that are not covered by the cauls 60. If desired, the vacuum fitting 75 may be integrated into the edge seal 62a such that it remains attached to the edge seal 62a and thus may be reused when the cauls 60 are removed from the part layup 50. Referring to FIG. 5C, in another example, the breather 90 may extend longitudinally beyond the outer edges of the cauls 60, onto the mandrel 52 so that it overlies one or more of the vacuum ports 68 in the mandrel 52. In this example, air and volatiles are drawn through the breather 90 into the vacuum ports 68 where vacuum is applied. As is also shown in FIG. 5C, the breather 90 may be extended longitudinally beyond the cauls 60 to intersect breather 92 at the T-junction, allowing a vacuum to be drawn beneath both edge seals 62a, 62b through the vacuum ports 68 in the mandrel 52. The longitudinal extension of the breather 90 in this manner allows a vacuum to be applied through both of the breathers 90, 92 to those areas beneath the edge seal 62a, 62b that are not covered by the cauls 60.

Referring to FIGS. 4 and 5, the inboard side 82 of the edge seal 62a is adhesively attached around its entire perimeter to the underlying caul 60a along an adhesive bond line 72. Likewise, edge seal 62b is adhesively attached around its entire perimeter to the underlying caul 60b along an adhesive bond line 74. Other techniques for attaching the edge seals 62a, 62b to the cauls 60a, 60b are possible.

Referring to FIGS. 4 and 6, the circumferential sections 88 of the edge seals 62a, 62b are draped down over the outer edges of the cauls 60a, 60b, and then down over the cross sectional profile of the mandrel 52, including a ramp 96 along the outer periphery 106 of the mandrel 52. Breather 92 and breather 94 are provided between the circumferential sections 88 of the edge seals 62a, 62b, and the underlying mandrel 52, typically located above the vacuum ports 68 (FIG. 4) to allow the escape of the air, and volatiles during processing. In one example, breather and breather 94 as well as breather 90 (FIG. 5) may comprise individual pieces that are installed separate from the edge seals 62a, 62b that cover them. However, in other examples, breather 90, breather 92 and breather 94 may be integrated into the edge seals 62a, 62b, as by molding. As will be discussed below in more detail, the flap 64 is sealed to the underlying longitudinal section of the edge seal 62b by any of a variety of clamping techniques. Similarly, the circumferential sections 88 of both edge seals 62a, 52b are sealed to the mandrel 52 using any of a variety of clamping techniques.

Figure 9:
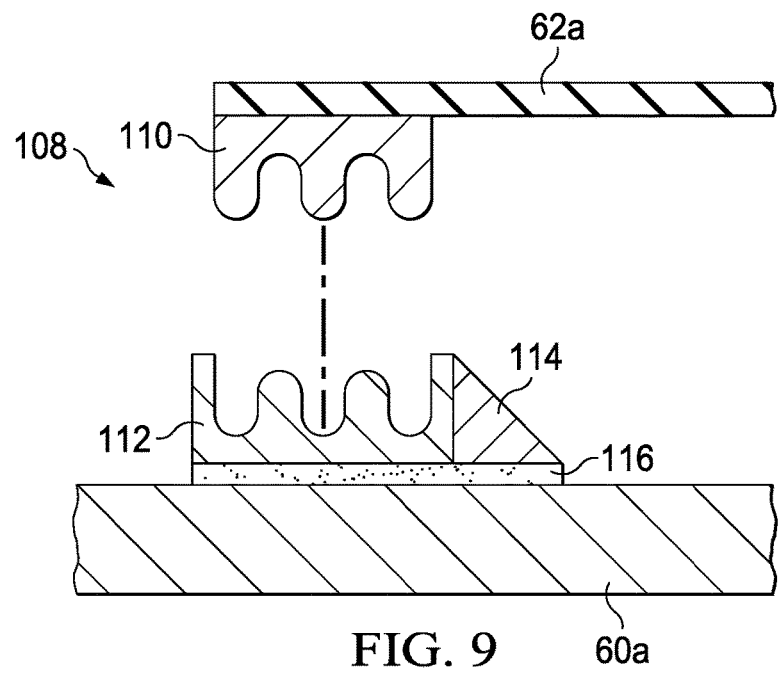
FIG. 9 is an illustration of a sectional view showing a zipper forming part of the alternate form of attachment shown in FIGS. 7 and 8.

In the example shown in FIGS. 4-6, the edge seals 62a, 62b are permanently attached to the underlying cauls 60a, 60b by the adhesive bond lines 72, 74, allowing each of the cauls 60 and their edge seals 62 to be removed together as an assembly. However some applications it may be desirable to have the ability to easily remove the edge seals 62a, 62b for any of various reasons. One technique for removably attaching the edge seals 62a, 62b to the cauls 60a, 69b is illustrated in FIGS. 7, 8, and 9. In this example, zippers 108 are employed to releasably attach the inner edges of the edge seal 62a to the caul 60a. The zippers 108 each comprises a first toothed member 112 attached by a layer of adhesive 116 to the underlying caul 60a, and a second toothed member 110 similarly attached to the edge seal 62a. Each of toothed member 110 and toothed member 112, may be formed of any suitable material such as silicone. Toothed member 110 and toothed member 112 friction fit together in interlocking relationship. In some examples, it may be necessary or desirable to provide a filler ramp 114 along an edge of the zipper 108 in order to smoothly ramp down the edge seal 62a from the zipper 108 to the surface of the caul 60a. The use of a zipper 108 allows the edge seal 62a to be easily removed when desired for cleaning, repair, and/or replacement. Other techniques for releasably attaching the edge seal 62a to the caul 60a are possible. In some examples, a zipper 108 may also be used to releasably attach either or both of the edge seals 62a, 62b to a caul 60 that is adjacent or to the mandrel 52. For example, in FIG. 7 the flap 64 may be releasably attached and sealed to the caul 60b by a zipper 108 (not shown), and in FIG. 8, the outer edge 104 (FIG. 6) of the edge seal 62a may be similarly releasably attached and sealed to the caul 60b by a zipper 108.

Figure 10:
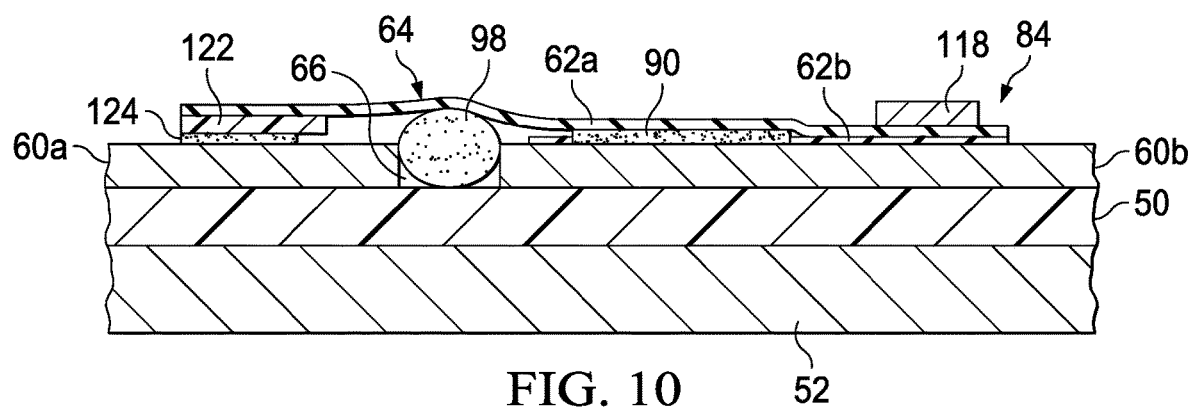
FIG. 10 is an illustration of a sectional view showing one form of sealing a flap of the edge seal over an edge seal on an adjacent caul using magnets.

A wide variety of techniques can be employed to releasably clamp or attach the flap 64 of edge seal 62a down over the edge seal 62b in order to form a vacuum tight seal between these two edge seals 62a, 62b. These same clamping techniques can be used to clamp and seal the longitudinal sections of the edge seals 62a, 62b to the mandrel 52. For example, referring to FIG. 10, the outer end 84 of the flap 64 can be permanently attached to a carbon fiber mounting strip 122 that is bonded by a layer of adhesive 124 to caul 60a. The outer end 84 of the flap 64 can be clamped to caul 60b by a series of magnets 118 and/or ferromagnetic materials that are placed on top of or embedded into the flap 64. The magnets 118 are attracted to the mandrel 52 or to ferromagnetic materials (not shown) embedded in the mandrel 52, thereby clapping the flap 64 down against the caul 60b. In some applications, it may also be possible to attach the edge seal 62a to the caul 60a using magnets 118 in lieu of the use of an adhesive.

Figure 11:
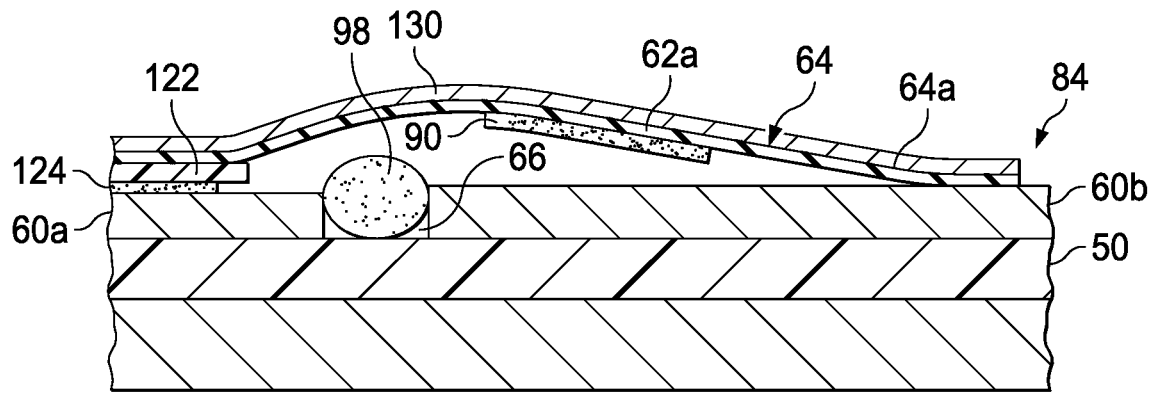
FIG. 11 is an illustration of a sectional view showing a further form of sealing the flap over an edge seal on an adjacent caul.

FIG. 11 illustrates another form of clamping devices in which spring members 130 such as carbon fiber stiffeners are bonded to the outer end 84 of the flap 64. It may be possible to fabricate the spring member 130 from materials other than carbon fiber, such as spring steel. The spring member 130 has a preformed curved shape that causes the outer extremities 64a of the flap 64 to be forced down onto positive engagement and seal against the caul 60b.

Figure 12:
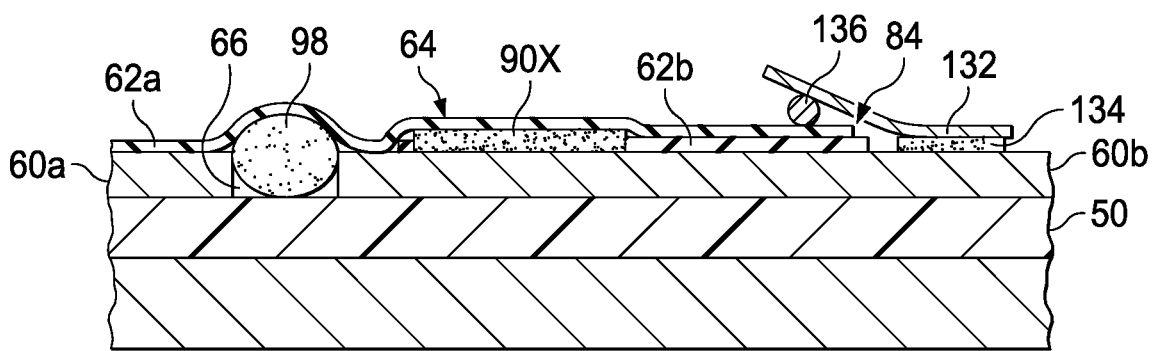
FIG. 12 is an illustration of a sectional view showing another form of sealing the flap over an edge seal on an adjacent caul.

FIG. 12 illustrates another technique for sealing the flap 64 against the caul 60b. In this example, a strip 132 of flexible spring material, such as a metal or carbon fiber is attached by adhesive 134 to the caul 60b. The strip 132 forces a pressure concentrator 136 such as a rod-like member which forces the outer end 84 of the flap 64 to seal against the edge seal 62b.

Figure 13:
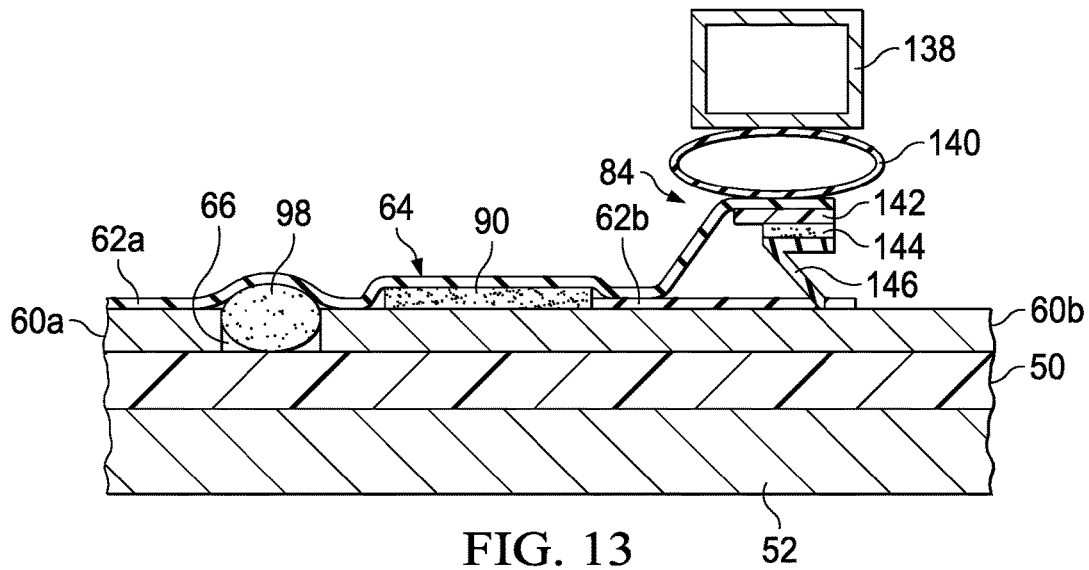
FIG. 13 is an illustration of a sectional view showing a further form of sealing the flap over an edge seal on an adjacent caul.

A further example of sealing the flap 64 against the caul 60b is shown in FIG. 13. In this example, the outer end 84 of the flap 64 includes a stiffener 142 secured by a layer of adhesive 144 to a flexible seal 146 having the cross sectional shape of an inverted "7". An inflatable hose 140 is positioned between the top of the flap 64, and a strongback 138 which may comprise, for example and without limitation, a rigid frame. Inflation of the hose 140 forces the flap 64 downwardly, causing the flexible seal 146 to collapse and form a vacuum tight seal between the flap 64 and the edge seal 62b. Alternatively, the strongback 138 may be displaced downwardly, causing a preinflated hose 140 to force the flexible seal 146 to collapse.

Figure 14:
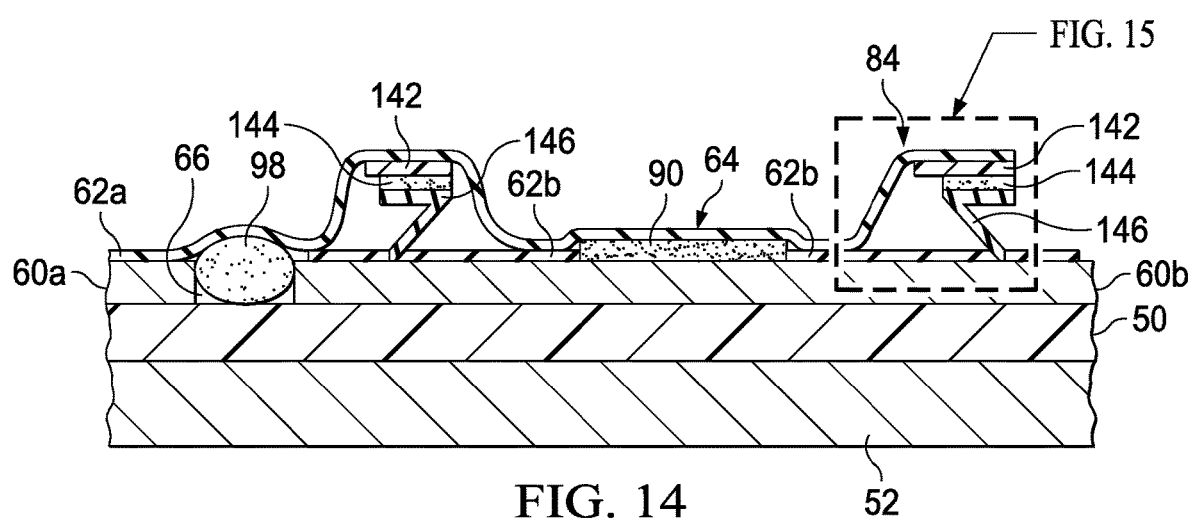
FIG. 14 is an illustration of a sectional view showing another form sealing the flap over an edge seal on an adjacent caul.
Figure 15:
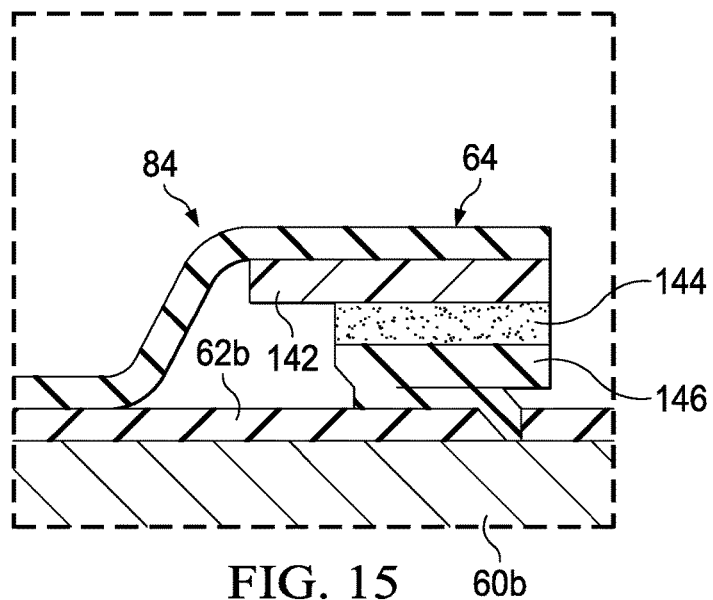
FIG. 15 is an illustration of a sectional view of one of the collapsible seals shown in FIG. 14, showing the seal in a collapsed condition.

Referring to FIGS. 14 and 15, in another example, a pair of the flexible seals 146 are positioned at spaced apart locations between the flap 64 and the edge seal 62b. In this example, the flexible seals 146 are subjected to a vacuum and act as vacuum chucks which draw down the flap 64, causing the flexible seals 146 to collapse (see FIG. 15) against the edge seal 62b, creating a vacuum tight seal between the edge seals 62a and 62b.

Figure 16:
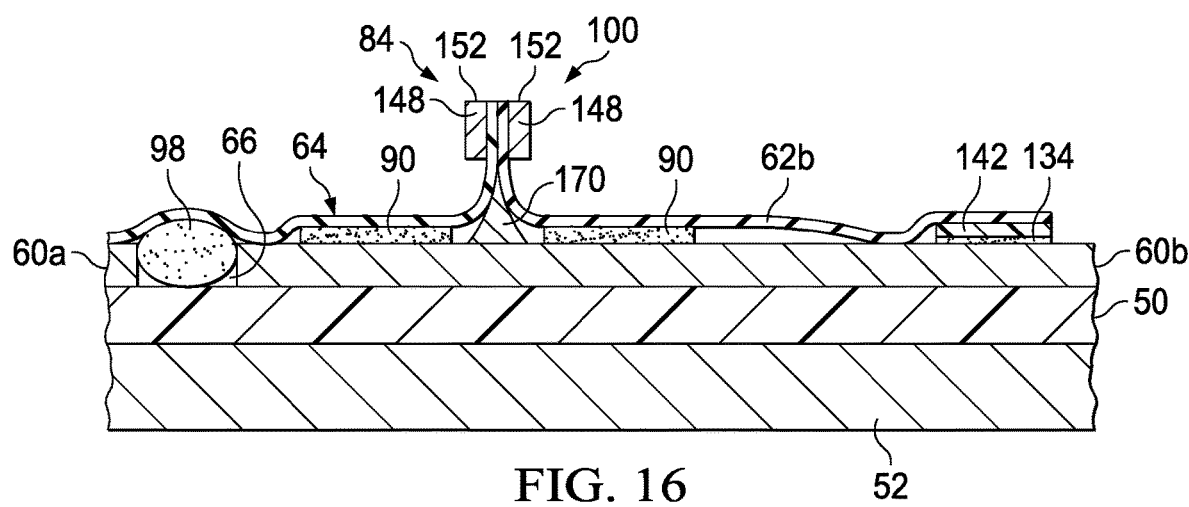
FIG. 16 is an illustration of a sectional view of a further form of sealing a flap over and edge seal on an adjacent caul.

Attention is now directed to FIG. 16, which illustrates another example of a technique for sealing the flap 64 against the edge seal 62b. In this example, rather than overlapping the flap 64 over the edge seal 62b, the outer end 84 of the flap 64 and the inner end 100 of the edge seal 62b are arranged in face-to-face relationship and are seal together with magnets 148 or other means, such as a clamp (not shown). A spacer 170 may be placed between the ends of the flap 64 and the edge seal 62b to maintain their face-to-face orientation.

Figure 17:
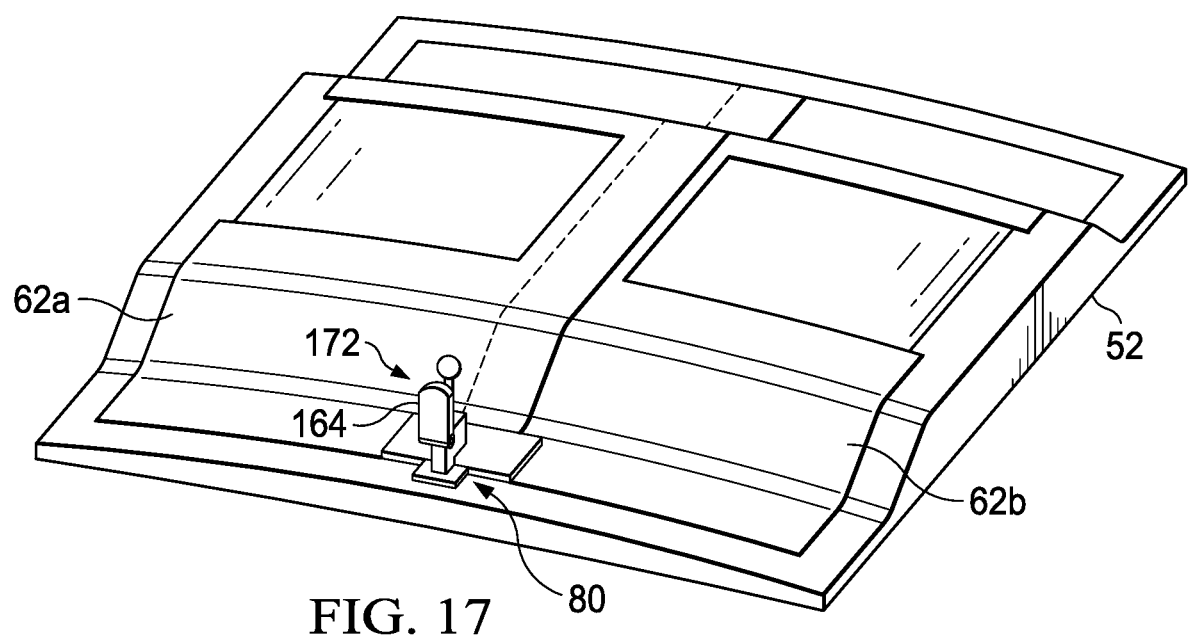
FIG. 17 is an illustration of a perspective view showing one form of sealing a T-joint in the edge seals.
Figure 18:
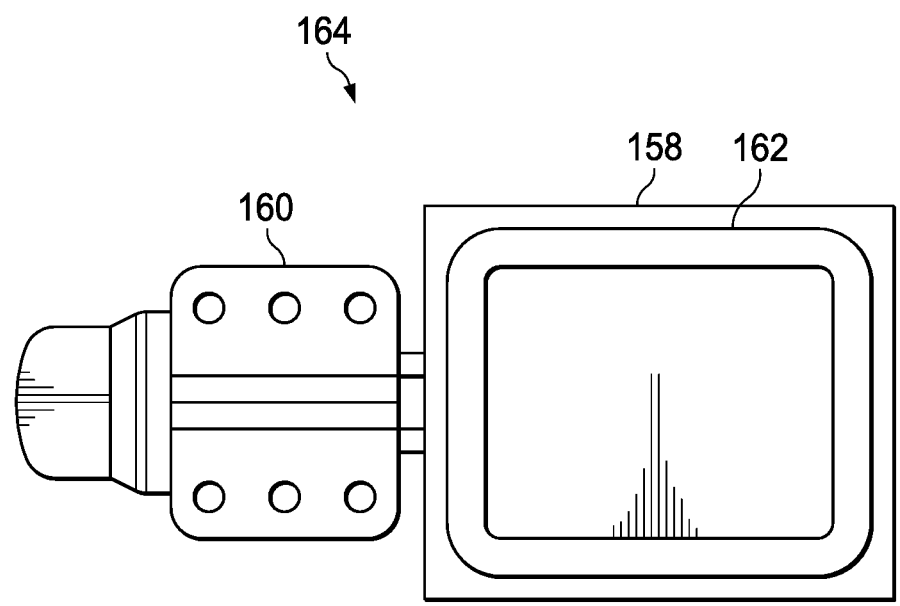
FIG. 18 is an illustration of a bottom plan view of a clamp shown in FIG. 17.

Referring to FIGS. 17 and 18, the longitudinal section 86 and the circumferential section 88 of the edge seals 62a, 62b intersect at a T-junction 80 as previously mentioned. In order to assure that there is no air leakage at the T-junction 80, a clamp 172 may be provided to force the two edge seal 62a, 62b together against the mandrel 52 at the T-junction. The clamp 172 may comprise any of a number of mechanisms, but in the illustrated example, comprises a toggle mechanism 164. The toggle mechanism includes a base 160 mounted on the mandrel 52 and a pressure plate 158. The bottom of the pressure plate 158 includes a rectangular, gasket-like seal 162. The toggle mechanism 164 forces the pressure plate 158 downwardly, causing the gasket-like seal 162 to apply pressure at the T-junction 80, thereby creating a tight seal at this location between the edge seals 62a and 62b.

Figure 19:
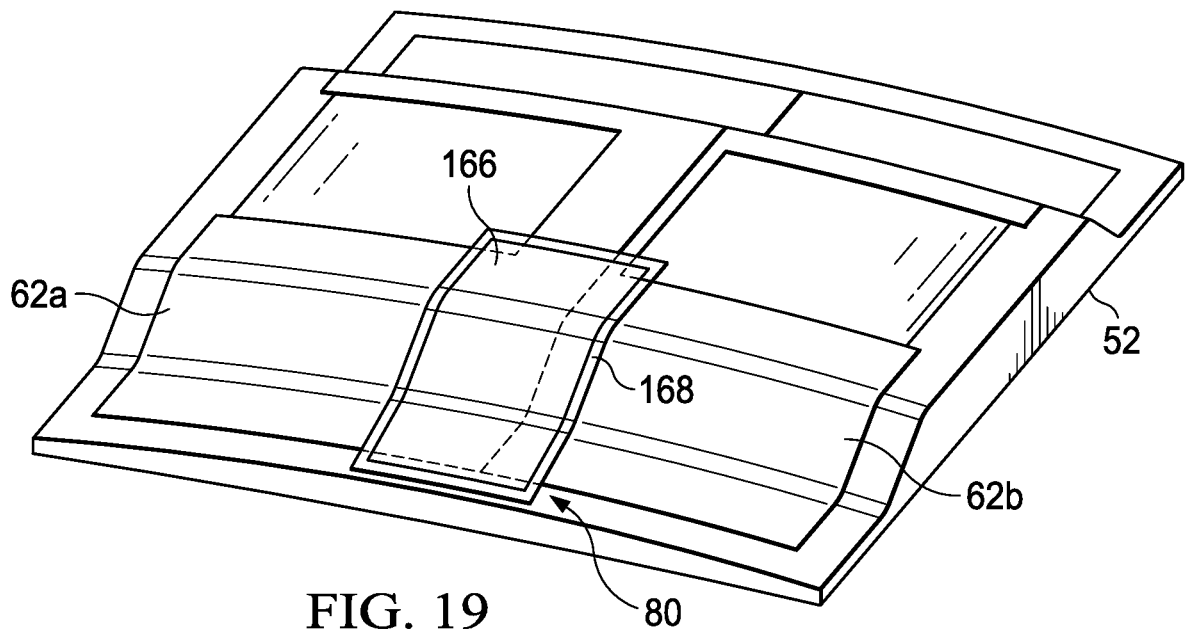
FIG. 19 is an illustration of a perspective view showing a further form of sealing the T-joint in the edge seals.

FIG. 19 illustrates another example of a technique for assuring that air leaks do not occur at the T-junction 80. In this example, a vacuum bag 166 is placed over the area of the T-junction and sealed to the underlying edge seals 62a, 62b by a bead of sealant 168.

Figure 20:
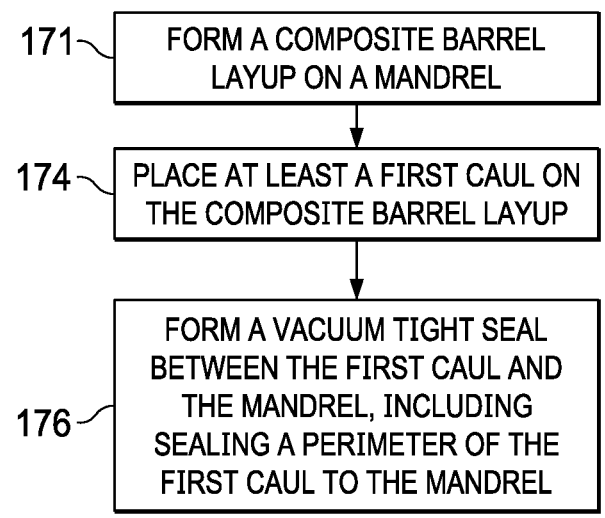
FIG. 20 is an illustration of a flow diagram of a method of making a section of a composite barrel.

Attention is now directed to FIG. 20, which broadly illustrates the steps of a method of making at least a section of a composite barrel using cauls 60 having the edge seals 62 described above. Beginning at 171, a composite barrel layup is formed on a mandrel 52. At 174, at least a first caul 60a is placed on the composite barrel layup. At 176, a vacuum tight seal is formed between the first caul 60a and the mandrel 52, thereby creating a local sealing zone. The seal at 176 may be formed by sealing the perimeter of the caul to the mandrel 52, as by sealing a strip of elastomeric material to the caul. Although not shown in FIG. 20, as previously described, cauls 60 may be installed on the composite barrel layup and sealed to the mandrel 52 and to each other using edge seals 62 that create localized sealing zones.

Figure 21:
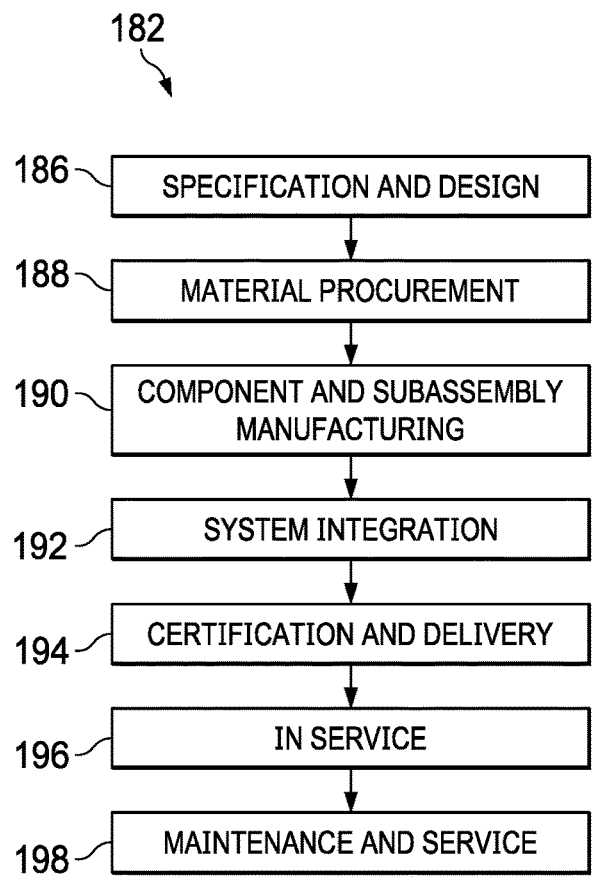
FIG. 21 is an illustration of a flow diagram of aircraft production and service methodology.
Figure 22:
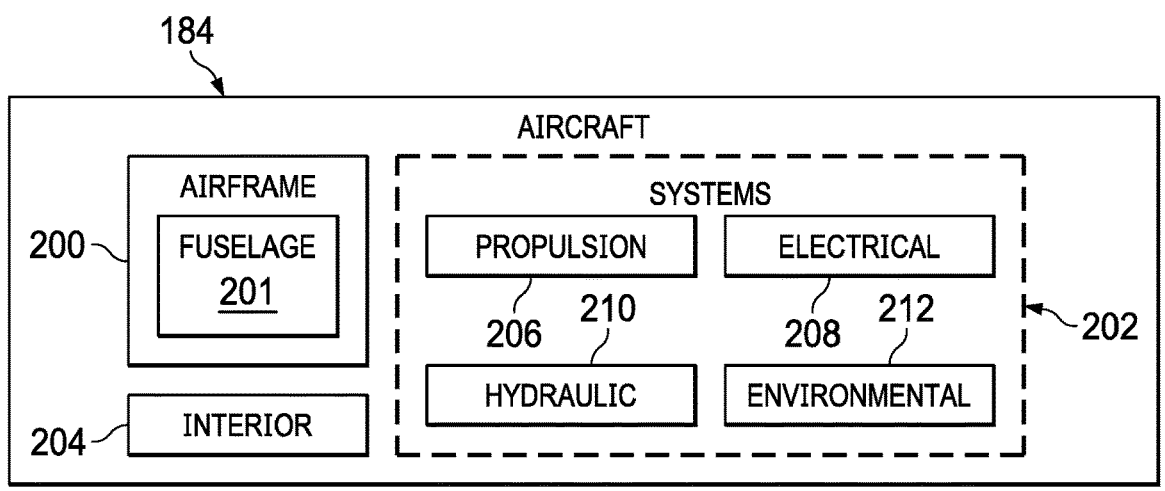
FIG. 22 is an illustration of a block diagram of an aircraft.

Examples of the disclosure may find use in a variety of potential applications, particularly in the transportation industry, including for example, aerospace, marine, and other applications where vacuum bag compaction of composite part layups utilize cauls. Thus, referring now to FIGS. 21 and 22, examples of the disclosure may be used in the context of an aircraft manufacturing and service method 182 as shown in FIG. 21 and an aircraft 184 as shown in FIG. 22. Aircraft applications of the disclosed examples may include a variety of composite parts and structures, including sections of a fuselage 201. During pre-production, exemplary manufacturing and service method 182 may include specification and design 186 of the aircraft 184 and material procurement 188. During production, component and subassembly manufacturing 190 and system integration 192 of the aircraft takes place. Thereafter, the aircraft 184 may go through certification and delivery 194 in order to be placed in service 196. While in service by a customer, the aircraft 184 is scheduled for routine maintenance and service 198, which may also include modification, reconfiguration, refurbishment, and so on. The disclosed embodiments may be used in one or more of production process 190 or production process, or in the airframe 200 or in the fuselage 201.

Each of the processes of manufacturing and service method 182 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 184 produced by exemplary manufacturing and service method 182 may include an airframe 200 having a fuselage 201, a plurality of high level systems 202 and an interior 204. Examples of high-level systems 202 include one or more of a propulsion system 206, an electrical system 208, a hydraulic system 210 and an environmental system 212. Any number of other systems may be included. Although an aerospace example is shown, the principles of the disclosure may be applied to other industries, such as the marine and automotive industries.

Systems and methods embodied herein may be employed during any one or more of the stages of the manufacturing and service method 182. For example, components or subassemblies corresponding to production process 190 may be fabricated or manufactured in a manner similar to components or subassemblies produced while the aircraft 184 is in service. Also, one or more apparatus examples, method examples, or a combination thereof may be utilized during production process 190 and production process 192, for example, by substantially expediting assembly of or reducing the cost of an aircraft 184. Similarly, one or more of apparatus examples, method examples, or a combination thereof may be utilized while the aircraft 184 is in service, for example and without limitation, to maintenance and service 198.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus for sealing at least first and second cauls over a composite barrel part layup up on a mandrel, comprising:
   a first edge seal integrated into the first caul, the first edge seal extending around an entire perimeter of the first caul, wherein a circumferential section of the first edge seal forms a vacuum tight seal between the first caul and the mandrel; and
   a second edge seal integrated into the second caul, the second edge seal extending around an entire perimeter of the second caul, wherein a circumferential section of the second edge seal forms a vacuum tight seal between the second caul and the mandrel;
   wherein the first and second edge seals each have longitudinal sections that intersect with their respective circumferential sections, wherein the longitudinal sections of the first and second edge seals overlap along the entirety of a longitudinal gap between the first and second cauls and are configured to form a vacuum tight seal between the first and second cauls, and wherein the longitudinal section of the first edge seal spans the longitudinal gap between the first and second cauls and the longitudinal section of the second edge seal does not span the longitudinal gap between the first and second cauls.

2. The apparatus of claim 1, wherein the longitudinal section of the first edge seal includes a flap configured to be placed over and sealed to the second edge seal.

3. The apparatus of claim 1, wherein the longitudinal sections of the first edge seal and the second edge seal intersect with their respective circumferential sections to each form a T-junction.

4. The apparatus of claim 1, wherein the longitudinal section of the first edge seal is sealed to the longitudinal section of the second edge seal.

5. The apparatus of claim 1, wherein the first edge seal includes a flap configured to overlie the second edge seal, wherein the flap spans the gap.

6. The apparatus of claim 5, including a clamp configured to clamp and seal the flap against the second edge seal.

7. The apparatus of claim 6, wherein the clamp includes magnets on the flap configured to be attracted to the mandrel and clamp the flap against the first edge seal.

8. The apparatus of claim 6, wherein the clamp includes carbon fiber stiffeners attached to and extending across the flap, the carbon fiber stiffeners being configured to press the flap down into positive engagement with the second edge seal.

9. The apparatus of claim 6, wherein the clamp comprises a plurality of collapsible seals interposed between the flap and the second edge seal and configured to press the flap down into positive engagement with the second edge seal.

10. The apparatus of claim 1, further comprising:
    a filler positioned within the longitudinal gap between the first and second cauls; and
    wherein the first edge seal includes a flap configured to overlie the second edge seal, wherein the filler is covered by the flap.

11. The apparatus of claim 1, further comprising:
    a filler positioned within the longitudinal gap between the first and second cauls; and
    wherein the longitudinal section of the first edge seal includes a flap that overlaps the longitudinal section of the second edge seal and the filler and is sealed to the longitudinal section of the second edge seal.

12. The apparatus of claim 1, wherein the first edge seal includes a flap configured to overlie the second edge seal, and wherein a breather is covered by the flap.

13. The apparatus of claim 1, further comprising a breather sandwiched between the first edge seal and the second edge seal.

14. The apparatus of claim 1, further comprising:
    a filler positioned within the gap;
    the first edge seal includes a flap configured to overlie the second edge seal; and
    a breather sandwiched between the first edge seal and the second edge seal, wherein the filler and the breather are covered by the flap.

15. The apparatus of claim 1, wherein:
    the first edge seal is permanently attached to the first caul to permit repeated use with the first caul and is removably attached to the mandrel to allow the first caul and the first edge seal to be removed together from the mandrel; and
    wherein the second edge seal is permanently attached to the second caul to permit repeated use with the second caul and is removably attached to the mandrel to allow the second caul and the second edge seal to be removed together from the mandrel.

16. A method of making at least a section of a composite barrel, comprising:
    forming a composite barrel part layup on a mandrel;
    placing at least a first caul and a second caul on the composite barrel part layup;
    forming a vacuum tight seal between the first caul and the mandrel, including sealing a perimeter of the first caul to the mandrel with a circumferential section of a first edge seal, wherein the first edge seal is integrated into the first caul and extends around the entire perimeter of the first caul; and
    forming a vacuum tight seal between the second caul and the mandrel, including sealing a perimeter of the second caul to the mandrel with a circumferential section of a second edge seal, wherein the second edge seal is integrated into the second caul and extends around the entire perimeter of the second caul;

wherein the first and second edge seals each have longitudinal sections that intersect with their respective circumferential sections, wherein the longitudinal sections of the first and second edge seals overlap along the entirety of a longitudinal gap between the first and second cauls and are configured to form a vacuum tight seal between the first and second cauls, and wherein the longitudinal section of the first edge seal spans the longitudinal gap between the first and second cauls and the longitudinal section of the second edge seal does not span the longitudinal gap between the first and second cauls.

17. The method of claim 16, wherein forming the vacuum tight seal between the first caul and the mandrel includes sealing a strip of elastomeric material around the entire perimeter of the first caul.

18. The method of claim 16, wherein forming the vacuum tight seal between the second caul and the mandrel, includes sealing a strip of elastomeric material around the entire perimeter of the second caul.

19. The method of claim 16, wherein forming a vacuum tight seal between the first caul and the mandrel comprises removably attaching the first edge seal to the mandrel to allow the first caul and the first edge seal to be removed together from the mandrel.

20. The method of claim 16, wherein forming a vacuum tight seal between the second caul and the mandrel comprises removably attaching the second edge seal to the mandrel to allow the second caul and the second edge seal to be removed together from the mandrel.

* * * * *